(12) United States Patent
Hanes

(10) Patent No.: US 10,854,199 B2
(45) Date of Patent: Dec. 1, 2020

(54) COMMUNICATIONS WITH TRIGGER PHRASES

(71) Applicant: HEWLETT-PACKARD DEVELOPMENT COMPANY, L.P., Houston, TX (US)

(72) Inventor: David H. Hanes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 141 days.

(21) Appl. No.: 16/095,691

(22) PCT Filed: Apr. 22, 2016

(86) PCT No.: PCT/US2016/028923
§ 371 (c)(1),
(2) Date: Oct. 22, 2018

(87) PCT Pub. No.: WO2017/184169
PCT Pub. Date: Oct. 26, 2017

(65) Prior Publication Data
US 2019/0130911 A1 May 2, 2019

(51) Int. Cl.
| | |
|---|---|
| G10L 15/00 | (2013.01) |
| G10L 15/22 | (2006.01) |
| G06F 3/16 | (2006.01) |
| G06F 1/3206 | (2019.01) |
| H04W 52/02 | (2009.01) |
| G10L 15/08 | (2006.01) |

(52) U.S. Cl.
CPC ............ *G10L 15/22* (2013.01); *G06F 1/3206* (2013.01); *G06F 3/167* (2013.01); *H04W 52/0229* (2013.01); *H04W 52/0254* (2013.01); *G10L 2015/088* (2013.01); *Y02D 30/70* (2020.08)

(58) Field of Classification Search
CPC ......... G10L 15/26; G10L 15/22; G10L 21/06; G10L 15/063; G10L 15/18; G10L 15/265; G10L 15/1815; G10L 21/10; G10L 15/183; G10L 15/1822; G10L 15/197; G10L 17/005; G10L 17/22; G06F 17/28; G06F 17/21; G06F 17/27; G06F 17/2705; G06F 2203/0381; G06F 17/24; G06F 17/273; G06F 17/2765
See application file for complete search history.

(56) References Cited

U.S. PATENT DOCUMENTS 5,983,186 A * 11/1999 Miyazawa ............... G10L 15/26
704/233
6,756,700 B2 * 6/2004 Zeng ...................... G06F 1/3231
307/112

(Continued)

OTHER PUBLICATIONS

Amazon Echo, https://s3-us-west-2.amazonaws.com/customerdocumentation/Amazon_Echo_Quick_Start.

*Primary Examiner* — Edgar X Guerra-Erazo
(74) *Attorney, Agent, or Firm* — HP Inc. Patent Department

(57) ABSTRACT

In one example of the disclosure, microphone data indicative of a user spoken phrase is captured utilizing a microphone. The microphone data is analyzed to detect a trigger phrase. A wakeup event is performed responsive to the detection of the trigger phrase. At least a portion of the microphone data is sent to the computing device for the computing device to send to a server system.

16 Claims, 6 Drawing Sheets

(56) References Cited

U.S. PATENT DOCUMENTS

| | | | |
|---|---|---|---|
| 6,859,776 B1 | 2/2005 | Cohen et al. | |
| 8,666,751 B2 * | 3/2014 | Murthi | G06F 3/017 704/275 |
| 8,886,545 B2 | 11/2014 | Meisel et al. | |
| 9,245,527 B2 * | 1/2016 | Lindahl | G06F 3/167 |
| 2009/0043580 A1 | 2/2009 | Mozer et al. | |
| 2013/0275875 A1 | 10/2013 | Gruber et al. | |
| 2013/0289994 A1 * | 10/2013 | Newman | G10L 15/32 704/254 |
| 2013/0325484 A1 * | 12/2013 | Chakladar | G10L 15/26 704/275 |
| 2013/0339028 A1 * | 12/2013 | Rosner | H04R 29/004 704/275 |
| 2014/0006825 A1 | 1/2014 | Shenhav | |
| 2014/0040748 A1 | 2/2014 | Lemay et al. | |
| 2014/0222436 A1 | 8/2014 | Binder et al. | |
| 2014/0229184 A1 * | 8/2014 | Shires | G10L 15/32 704/275 |
| 2014/0244273 A1 * | 8/2014 | Laroche | G06F 1/3206 704/275 |
| 2014/0309996 A1 | 10/2014 | Zhang | |
| 2015/0026580 A1 | 1/2015 | Kang et al. | |
| 2015/0230171 A1 * | 8/2015 | Sun | H04W 52/0209 455/41.2 |
| 2019/0027138 A1 * | 1/2019 | Wang | G10L 15/1815 |

* cited by examiner

COMMUNICATIONS WITH TRIGGER PHRASES

BACKGROUND

In today's world, users are increasingly utilizing technology-based devices, including smartphones, tablets, and personal computers, to access voice-accessible virtual assistant functions. Popular virtual assistant functions including providing users with answers to voice-presented questions by accessing search engines, email, SMS, electronic calendars, electronic contacts directories, and other applications.

DRAWINGS

DETAILED DESCRIPTION

Figure 1:
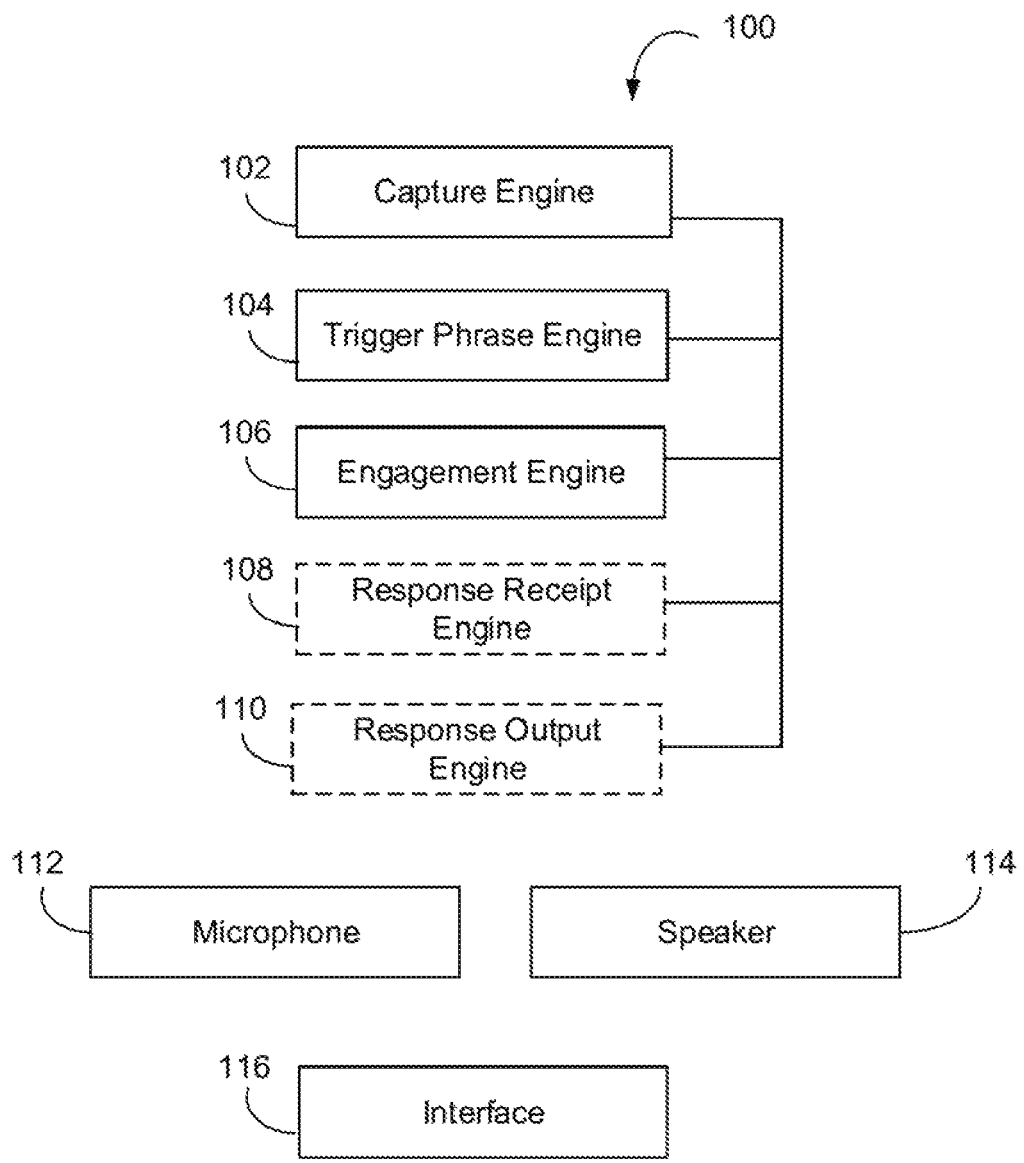
FIG. 1 is a block diagram depicting n example of an apparatus to enable communication utilizing trigger phrases.

A user accessing a virtual assistant application or service can quickly obtain answers to questions regarding the user's calendar, local weather predictions, traffic conditions, sports scores, news, and other information accessible to the virtual assistant via an application or via the internet. In some circumstances, a user will carry the handheld computing device such as a smartphone or notebook computer with him or her to multiple locations in order to have accessibility to the virtual assistant. In other circumstances, a user may have multiple computing devices that can access the virtual assistant, and choose to keep such devices in multiple rooms of a dwelling to maintain accessibility to a virtual assistant application or service. However, each of these current scenarios have drawbacks. In the first example, carrying a computing device from room to room in a dwelling over a protracted period of time may not be practical in some circumstances due to the user forgetting or being unable to carry the device for a time, the need to use the device for other purposes, battery life, and other factors. In the second example, maintaining multiple computing devices that can access the virtual assistant in a dwelling can be impractical in some circumstances due to expense of maintaining a computing device in multiple rooms, and/or due to the delays in accessing a virtual assistant due to time outs or the computing device being used for other computing purposes that might preclude use of the digital assistant. Further, in the example of multiple computing device in different rooms of a dwelling, there may be the complications of maintaining a network to support the devices such that user could approach and interact with each computing device to enjoy the same digital assistant experience.

To address these issues, various examples described in more detail below provide an apparatus and a method that enable communication utilizing trigger phrases. In an example, a communication apparatus, including a speaker and microphone, may be electronically connected to, e.g., via a wireless connection, to a personal computer, smartphone, or other computing device. In examples, the communications apparatus may be a standalone device or a device remote from the computing device. In an example, the communication apparatus may capture microphone data indicative of a user spoken phrase using the microphone at the device and analyze the microphone data to detect a trigger phrase. Responsive to the detection of the trigger phrase, the communication apparatus may perform a wakeup event. In one example, the wakeup event may be an event to reestablish a wireless connection with the computing device. In another example, the wakeup event may be to send a wakeup message to the computing device. The communication apparatus may send at least a portion of the microphone data to the computing device. The computing device, having received the at least a portion of the microphone data may in turn send, e.g., via the Internet, an intranet, or other network, the at least a portion of the microphone data to a server system hosting a virtual assistant service. In examples, the communication apparatus may receive from the computing device a response phrase that was sent from the server system hosting the virtual assistant service to the computing device, and in turn cause an output of the response phrase via the speaker included with the communication apparatus.

In an example, the detected trigger phrase sent may be a phrase unique to the communication apparatus and is to wake the communication apparatus from a low power mode. This can be advantageous in situations where the communication apparatus is powered by a battery and is electronically connected to the computing device via a wireless network connection, thus allowing the communication apparatus to operate in a low power or standby mode when the communication apparatus is not being engaged by a user.

In an example, the trigger phrase that is detected at the communication apparatus may be a first trigger phrase that the communication apparatus recognizes as an instruction to wake the communication apparatus from a low power mode. In this example, the communication apparatus may in turn reformat the first trigger phrase to a second trigger phrase, or add such a second trigger phrase to the at least a portion of the microphone data, to wake a virtual assistant service hosted by the server system, and wherein the second trigger phrase is included in the at least a portion of the microphone data sent to the computing device, for the computing device to send to the server.

In an example, the communication apparatus may analyze the microphone data to detect the trigger phrase, and is not to otherwise analyze the microphone data. In a particular example, the communication apparatus may apply a voice recognition analysis or application to the microphone data to detect the trigger phrase, and is not to otherwise apply voice recognition analysis to the microphone data.

In an example, the communication apparatus may send a wakeup message to the computing device that is to wake the computing device from a power-saving state, with the wakeup message mimicking typing or touching at a keypad, keyboard, or touchscreen included within or connected to the computing device. In another example, the communication apparatus may send a wakeup message to the computing device that is to wake the computing device from a power-saving state, with the wakeup message mimicking a movement or click of a pointing device included within or connected to the computing device to wake the computing device. In another example, the communication apparatus may send a wakeup message to the computing device to wake the computing device from a power-saving state, with the wakeup message including a magic packet for waking up the computing device.

In an example, the communication apparatus may be a remote or standalone first communication apparatus among a set of remote or standalone communication apparatuses connected to the computing device via a private network (e.g., a set of remote or standalone communication systems connected via a wireless connection in a household). In this example, the wakeup event performed by the first communication apparatus may be to send a message to the computing device to establish the first communication apparatus as the default communication apparatus for the computing device to receive microphone data from.

In this manner, the disclosed examples provide for an efficient and easy to use communication method, and a communication apparatus that can interact with a computing device that is in electronic communication with a server system that hosts a virtual assistant service. The disclosed method and apparatus enable a user to have a consistent way to interact with the remote or standalone communication apparatus by using the communication apparatus's unique wakeup phrase, regardless of the platform of the connected computing device, and without a need to remember the wakeup word that may be expected by the virtual assistant in communication with the computing device. This can be particularly useful in cases where multiple communication apparatuses are employed in in a household, and/or in cases where a communication apparatus may be used with connected computing devices of different platforms. Further, in instances where the communication apparatus is a battery powered device, the ability to employ limited processing to recognize a wakeup phrase before sending full microphone data to the connected computing device can result in a reduced rate of battery depletion. Users should thus appreciate the ease of use and reduced cost to be enjoyed with utilization of the disclosed examples.

Figure 2:
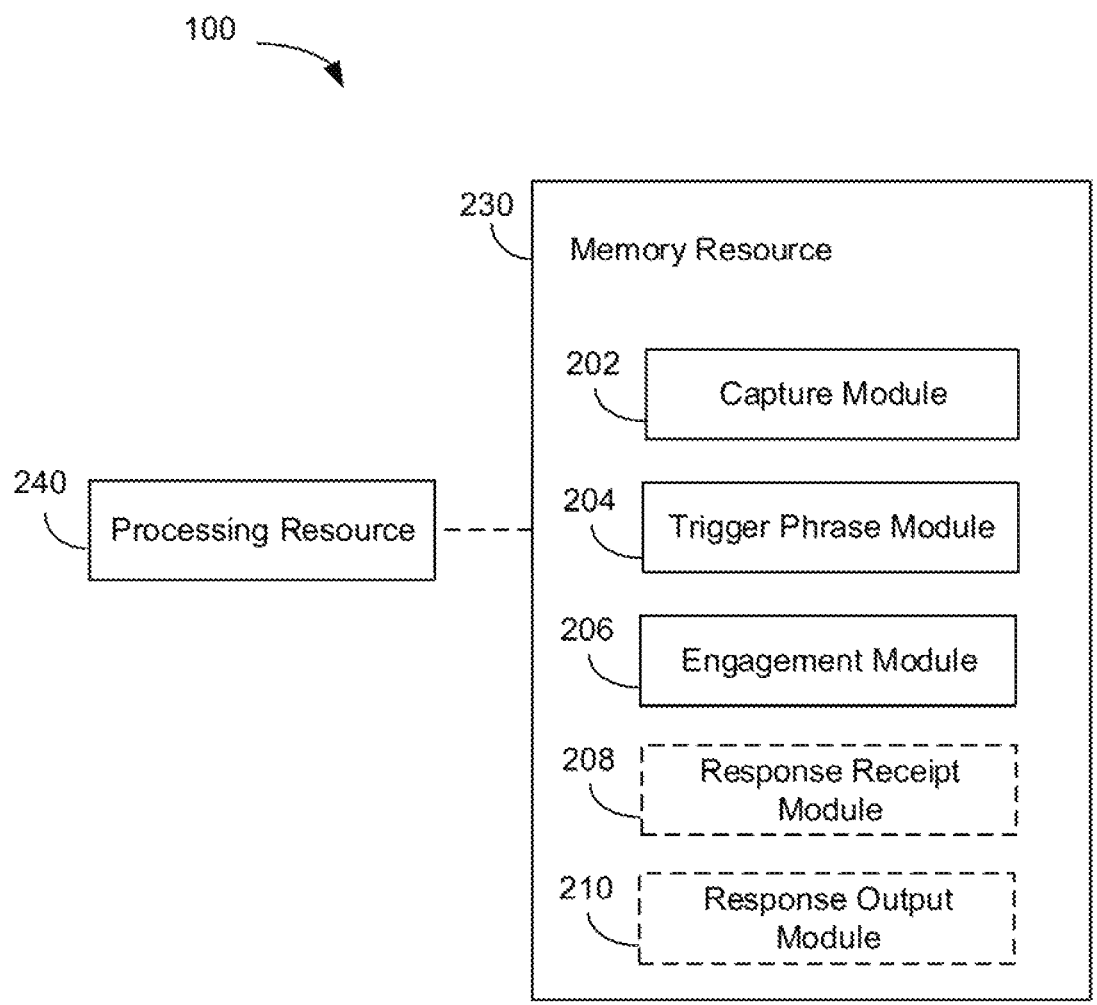
FIG. 2 is a block diagram depicting a memory resource and a processing resource to implement examples of an apparatus for communication utilizing trigger phrases.

FIGS. 1 and 2 depict examples of physical and logical components for implementing various examples. In FIG. 1 various components are identified as engines 102, 104, 106, 108, and 110. In describing engines 102-110 focus is on each engine's designated function. However, the term engine, as used herein, refers generally to a combination of hardware and programming to perform a designated function. As is illustrated later with respect to FIG. 2, the hardware of each engine, for example, may include one or both of a processor and a memory, while the programming may be code stored on that memory and executable by the processor to perform the designated function.

FIG. 1 is a block diagram depicting components of an apparatus 100 to enable communication utilizing trigger phrases. In this example, apparatus 100 includes a microphone 112, a speaker 114, and an interface 116. As used herein, a "microphone" refers generally to any device converting sound waves into electrical energy variations, which may then be recorded or otherwise captured, amplified, or transmitted. As used herein, a "speaker" refers generally to any device that is to convert a received electrical audio signal into a corresponding sound. As used herein, an "interface" at a communication apparatus refers generally to any combination of hardware and software that facilitates connection with another computing device via network. In examples wherein the network is a wireless network, interface 116 may be a network interface controller which connects to a radio-based computer network. Interface options for wireless networks include, but are not limited to a USB dongle with a wireless network interface device, and a Bluetooth™ interface card. Alternatively, in an example in which the network is a wired network, interface 116 might be a token ring or Ethernet.

In this example, apparatus 100 includes a capture engine 102, trigger phrase engine 104, engagement engine 106, response receipt engine 108, and response output engine 110. In performing their respective functions, engines 102-110 may access a data repository, e.g., a memory accessible to apparatus 100 that can be used to store and retrieve data.

In an example, capture engine 102 represents generally a combination of hardware and programming to capture, utilizing the microphone 112 at the communication apparatus, data that is indicative of a user spoken phrase detected at the microphone ("microphone data"). As used, herein, to "capture" data refers generally to collect or receive information and change the collected information into a form that can be read and used by a computer. Trigger phrase engine 104 represents generally a combination of hardware and programming to analyze the captured microphone data to detect a trigger phrase. A "phrase" refers generally to a set of words (i.e. one or more words) that function as a unit or constituent to convey a thought or concept. As used herein a "word" refers generally to a meaningful element of speech or writing, typically to communicate a thought or concept. As used herein, a "trigger phrase" refers generally to a phrase that, when detected as having been spoken, is to cause a device (e.g., a communication apparatus, a computing device, server system) to perform an action or initiate an event.

In one example, the trigger phrase is a phrase that is unique to the communication apparatus, and is a phrase that is, upon detection, to wake the communication apparatus from a low power mode. As used herein, to "wake" or "wake up" an electronic device refers generally to causing the device to transition out of a sleep mode, power-saving mode, or other mode at which the device is operating at a reduced speed or capability. For instance, if the communication apparatus is a battery powered apparatus that is electronically connected to the computing device via a wireless network connection, allowing the communication apparatus to operate at a lower power mode until a trigger word is detected will conserve battery power. In examples, trigger phrase engine 104 may be to analyze the microphone data to detect the trigger phrase, and is not to otherwise analyze the microphone data. In examples, trigger phrase engine 104 is to apply a voice recognition analysis (e.g., utilizing a voice to text application) to the microphone data to detect the trigger phrase, and the communication apparatus is not to otherwise apply voice recognition analysis to the microphone data.

Continuing at FIG. 1, engagement engine 106 represents generally a combination of hardware and programming to, responsive the detection of the trigger phrase by trigger phrase engine 104, perform a makeup event, and to send at least a portion of the microphone data to the computing device. As used herein, a "wakeup event" refers generally to any event taken by the communication apparatus that facilitates or enables communication between the communication apparatus and a computing device. In one example, the wakeup event may be for the communication apparatus to reestablish a wireless connection with the computing device.

In another example, the wakeup event performed by the communication apparatus may be to send a wakeup message to the computing device. For instance, the communication apparatus may send a wakeup message to the computing device to wake the computing device from a power-saving state. In a particular example, the wakeup message sent to the computing device may include a script that mimics typing or touching at a keypad, keyboard, or touchscreen included within or connected to the computing device, or mimics a movement or click by a pointing device included within or connected to the computing device, so as to wake the computing device. As used herein a "pointing device" refers generally to any input interface that allows a user to input spatial data to a computer. Examples of pointing devices include, but are not limited to, a mouse, joystick, trackball, pointing stick or pen, and a finger tracking device. In another particular example, the wakeup message sent to the computing device may include sending of a magic packet to the computing device. As used herein, a "magic packet" refers generally to a network packet that when received by a computer via a network connection is to wake the computer from a power saving mode, a sleep mode, etc.

Continuing at FIG. 1, engagement engine 106 is also to send the at least a portion of the microphone data to the computing device such that the computing device will send the at least a portion of the microphone data to a server system that hosts a virtual assistant service. As used herein, a "virtual assistant" or "virtual assistant service" refers generally to an application or other computer program that uses artificial intelligence to perform tasks or services for a user via a smartphone, notebook computer, desktop computer, or other computing device that is in electronic connection with a server system hosting the service. In examples, the tasks or services are performed based on user input, location awareness, and the ability to access information from a variety of online sources (such as weather or traffic conditions, news, stock prices, user schedules, retail prices, etc.). The server system can then, process the at least a portion of the microphone data to determine a user question or inquiry that was spoken to the communication apparatus. The server system may then determine a response phrase for the question or inquiry, e.g., by accessing applications (e.g., search applications, weather applications, sports score applications, etc.) and/or by accessing the internet. The server system may then send the determined response phrase to the computing device, for the computing device to in turn provide the response phrase to the communication apparatus via a network.

In certain examples, communication apparatus 100 may additionally include a response receipt engine 108 and a response output engine 110. The response receipt engine 108 is to receive from the computing device the response phrase that the server system sent to the computing device. The response output engine 110 to cause output, via the speaker included within the communication apparatus, of the response phrase that had been determined at the server system.

In a particular example there may be an environment in which a set of the disclosed communication apparatuses are connected to the computing device via a private network, e.g., a Bluetooth™, Wi-Fi™, or any other network connection. In this example, a user may interact with a first communication apparatus among the set of communication apparatuses by speaking a phrase to the communication apparatus. In this scenario capture engine 102 at the first communication apparatus may utilize the microphone included within the first communication apparatus to capture microphone data indicative of the user spoken phrase. Trigger phrase engine 104 at the first communication apparatus may analyze the microphone data to detect a trigger phrase. Engagement engine 106 at the first communication apparatus may, responsive to the detection of the trigger phrase, perform a wakeup event that is to send a message to the computing device to establish the first communication apparatus as a default communication apparatus for the computing device to receive microphone data from. In this example, engagement engine 106 may then send the at least a portion of the microphone data to the computing device, for the computing device to send the at least a portion of the microphone data to a server system hosting a virtual assistant service. In certain examples the first communication apparatus may include a response receipt engine 108 to receive from the computing device a response phrase sent from the server system to the computing device, and a response output engine 110 to cause output of the response phrase utilizing a speaker included or connected to the communication apparatus.

In another particular example, a communication apparatus may include a microphone, a speaker, an interface, and a capture engine as previously discussed. In this particular example, however, trigger phrase engine 104 may analyze the microphone data to detect a first trigger phrase that is to wake the communication apparatus from a low power mode, and engagement engine 106 may reformat the first trigger phrase to a second trigger phrase. The second trigger phrase is a phrase that, when sent by engagement engine 106 to the computing device as part of the at least a portion of the microphone data, and when subsequently sent by the computing device to the server system hosting the virtual assistant service, will wake the virtual assistant service.

In examples, engagement engine 106 may send at least a portion of captured microphone data to the computing device over a link (see, e.g. FIG. 3, 310) via a networking protocol. In another example, response receipt engine 108 may receive the response phrase from the computing device over a link via a networking protocol. In examples the networking protocol may include, but is not limited to, Transmission Control Protocol/Internet Protocol ("TCP/IP"), HyperText Transfer Protocol ("HTTP"), and/or Session Initiation Protocol ("SIP").

In the foregoing discussion of FIG. 1, engines 102-110 were described as combinations of hardware and programming. Engines 102-110 may be implemented in a number of fashions. Looking at FIG. 2 the programming may be processor executable instructions stored on a tangible memory resource 230 and the hardware may include a processing resource 240 for executing those instructions. Thus memory resource 230 can be said to store program instructions that when executed by processing resource 240 implement apparatus 100 of FIG. 1.

Memory resource 230 represents generally any number of memory components capable of storing instructions that can be executed by processing resource 240. Memory resource 230 is non-transitory in the sense that it does not encompass a transitory signal but instead is made up of a memory component or memory components to store the relevant instructions. Memory resource 230 may be implemented in a single device or distributed across devices. Likewise, processing resource 240 represents any number of processors capable of executing instructions stored by memory resource 230. Processing resource 240 may be integrated in a single device or distributed across devices. Further, memory resource 230 may be fully or partially integrated in the same device as processing resource 240, or it may, be separate but accessible to that device and processing resource 240.

In one example, the program instructions can be part of an installation package that when installed can be executed by processing resource 240 to implement apparatus 100. In this case, memory resource 230 may be a portable medium such as a CD, DVD, or flash drive or a memory maintained by a server from which the installation package can be downloaded and installed. In another example, the program instructions may be part of an application or applications already installed. Here, memory resource 230 can include integrated memory such as a hard drive, solid state drive, or the like.

In FIG. 2, the executable program instructions stored in memory resource 230 are depicted as capture module 202, trigger phrase module 204, engagement module 206, response receipt module 208, and response output module 210. Capture module 202 represents program instructions that when executed by processing resource 240 may perform any of the functionalities described above in relation to capture engine 102 of FIG. 1. Trigger phrase module 204 represents program instructions that when executed by processing resource 240 may perform any of the functionalities described above in relation to trigger phrase engine 104 of FIG. 1. Engagement module 206 represents program instructions that when executed by processing resource 240 may perform any of the functionalities described above in relation to engagement engine 106 of FIG. 1. Response receipt module 208 represents program instructions that when executed by processing resource 240 may perform any of the functionalities described above in relation to response receipt engine 108 of FIG. 1. Response output module 210 represents program instructions that when executed by processing resource 240 may perform any of the functionalities described above in relation to response output engine 110 of FIG. 1.

Figure 3:
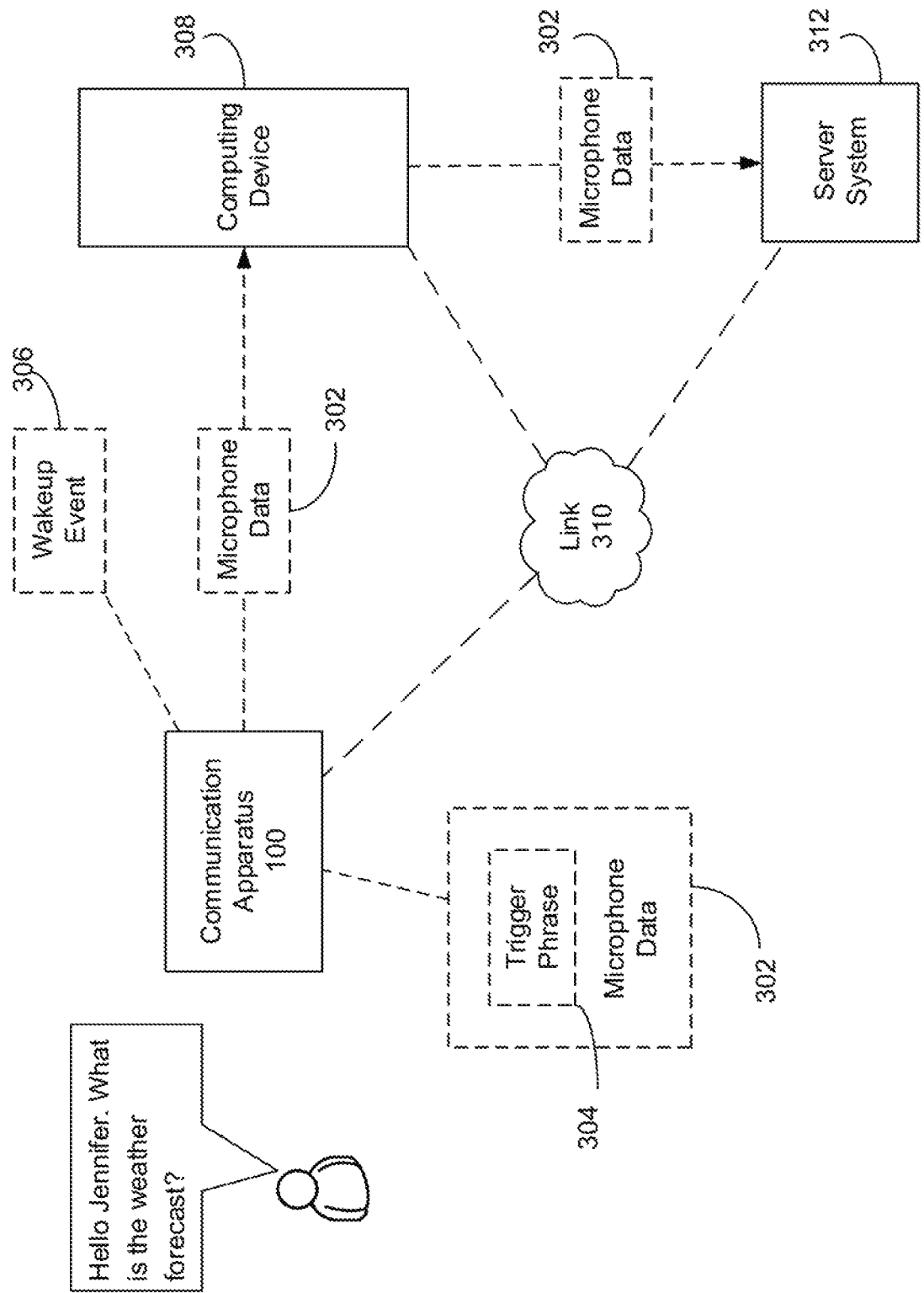
FIG. 3 illustrates an example of a communication utilizing trigger phrases.

FIG. 3, in view of FIGS. 1, and 2, illustrates an example of communication utilizing trigger phrases. In examples, a communication apparatus 100 may capture, utilizing a microphone that is included with the communication apparatus 100, microphone data 302 that indicative of a user spoken phrase. For instance, a user may speak a phrase "Hello Jennifer, What is the weather forecast?" In this example, communication apparatus 100 would, upon capturing the microphone data 302 relating to the detected user spoken phrase, analyze the microphone data to detect a trigger phrase 304 within the microphone data 302 indicative of the phrase "Hello Jennifer. What is the weather forecast?" In this example, the trigger phrase 304 is "Hello Jennifer", a phrase that unique to the communication apparatus 100 and that is recognizable by the communication apparatus to wake the communication apparatus from a low power or battery-saving mode. In an example the trigger phrase 304 "Hello Jennifer" could be a trigger phrase applicable to all communication apparatuses of the same model and/or manufacturer. In another example the trigger phrase 304 "Hello Jennifer" could be a customized trigger phrase, e.g., a phrase that was set by a user of the communication apparatus 100 according to communication apparatus functionality enabling the user to choose a customized trigger phrase.

Communication apparatus 100, in response to having detected of the trigger phrase 304 "Hello Jennifer" in the microphone data 302, performs a wakeup event 306, and sends at least a portion of the microphone data to a computing device 308 that is electronically connected to the communication apparatus via a link 310. Communication apparatus 100 sends at least a portion of the microphone data 302 to the computing device 308 in order that the computing device will in turn send the microphone data to a server system 312 that hosts a virtual assistant service.

As used herein, link 310 represents generally an infrastructure or combination of infrastructures to enable an electronic connection, wireless connection, other connection, or combination thereof, to enable data communication between components and/or computing devices, e.g. communication apparatus 100, computing device 308, and/or server system 312. Such infrastructure or infrastructures may include, but are not limited to, a cable, wireless, fiber optic, or remote connections via telecommunication link, an infrared link, or a radio frequency link. For example, link 310 may represent the internet, intranets, and intermediate routers, switches, and other interfaces. As used herein, a "computing device" may be a server, computer networking device, chip set, desktop computer, notebook computer, workstation, tablet computer, smartphone or another processing device or equipment. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Continuing at FIG. 3, in one example, communication apparatus 100 may send all of the captured microphone data, e.g., "Hello Jennifer. What is the weather forecast?" to the computing device 308. In another example, communication apparatus 100 may excise the trigger phrase "Hello Jennifer" from the microphone data, and send the portion of the microphone data indicative of "What is the weather forecast?" to the computing device.

In a particular example, communication apparatus 100 may reformat the trigger phrase that is to awaken the communication apparatus to a new trigger phrase that is predetermined to wake a virtual assistant service hosted by a server system 312 in communication with computing device 308. In another particular example, communication apparatus 100 may add the new trigger phrase that is to awaken the communication apparatus to the at least a portion of the microphone data 302 sent to computing device 308. In either of these particular examples, communication apparatus 100 may include the new trigger phrase that is to wake the virtual assistant service in the at least a portion of the microphone data 302 sent to computing device 308.

Continuing at FIG. 3, in one example, the wakeup event 306 performed by communication apparatus 100 may be to reestablish a wireless connection between communication apparatus 100 and computing device 308. For instance, the communication apparatus 100 and/or the computing device 308 may include programming to cause the wireless connection to be dropped during a predetermined period of inactivity, and the wakeup event 306 may be to reestablish the wireless connection.

In another example, the wakeup event 306 may be for communication apparatus 100 to send a wakeup message to computing device 308 to wake the computing device from a power-saving state. In examples, the wakeup message may be a message that mimic typing or touching at a keypad, keyboard, or touchscreen of computing device 308 so as to waken the computing device. In other examples, the wakeup message sent by communication apparatus 100 may be a magic packet that when received by computing device 308 causes the computing device to awaken.

Communication apparatus 100 may receive a response phrase from computing device 308. The response phrase is a response phrase that was sent to computing device 308 by the server system 312 hosting the virtual assistant service. Communication apparatus 100 may then cause an output of the received response phrase via a speaker included within the communication apparatus.

Figure 4:
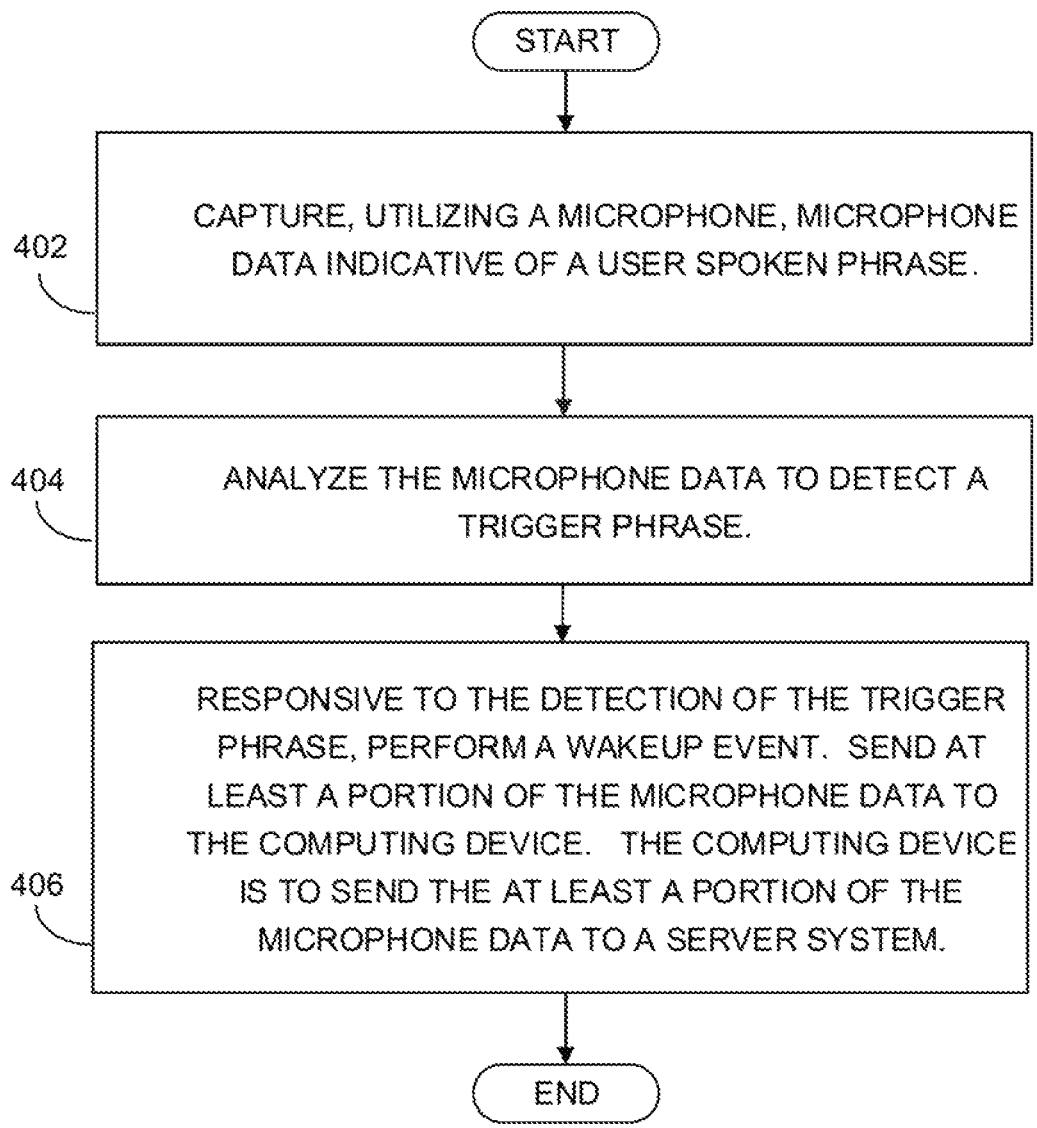
FIG. 4 is a flow diagram depicting implementation of an example of a communication method utilizing trigger phrases.

FIG. 4 is a flow diagram of implementation of a method for communication utilizing trigger phrases. In discussing FIG. 4, reference may be made to the components depicted in FIGS. 1 and 2. Such reference is made to provide contextual examples and not to limit the manner in which the method depicted by FIG. 4 may be implemented. Microphone data indicative of a user spoken phrase is captured utilizing a microphone (block 402). Referring back to FIGS. 1 and 2, capture engine 102 (FIG. 1) or capture module 202 (FIG. 2), when executed by processing resource 240, may be responsible for implementing block 402.

The microphone data is analyzed to detect a trigger phrase (block 404). Referring back to FIGS. 1 and 2, trigger phrase engine 104 (FIG. 1) or trigger phrase module 204 (FIG. 2), when executed by processing resource 240, may be responsible for implementing block 404.

Responsive to the detection of the trigger phrase, a wakeup event is performed. At least a portion of the microphone data is sent to the computing device. The computing device is to send the at least a portion of the microphone data to a server system (block 406). Referring back to FIGS. 1 and 2, engagement engine 106 (FIG. 1) or engagement module 206 (FIG. 2), when executed by processing resource 240, may be responsible for implementing block 406.

Figure 5:
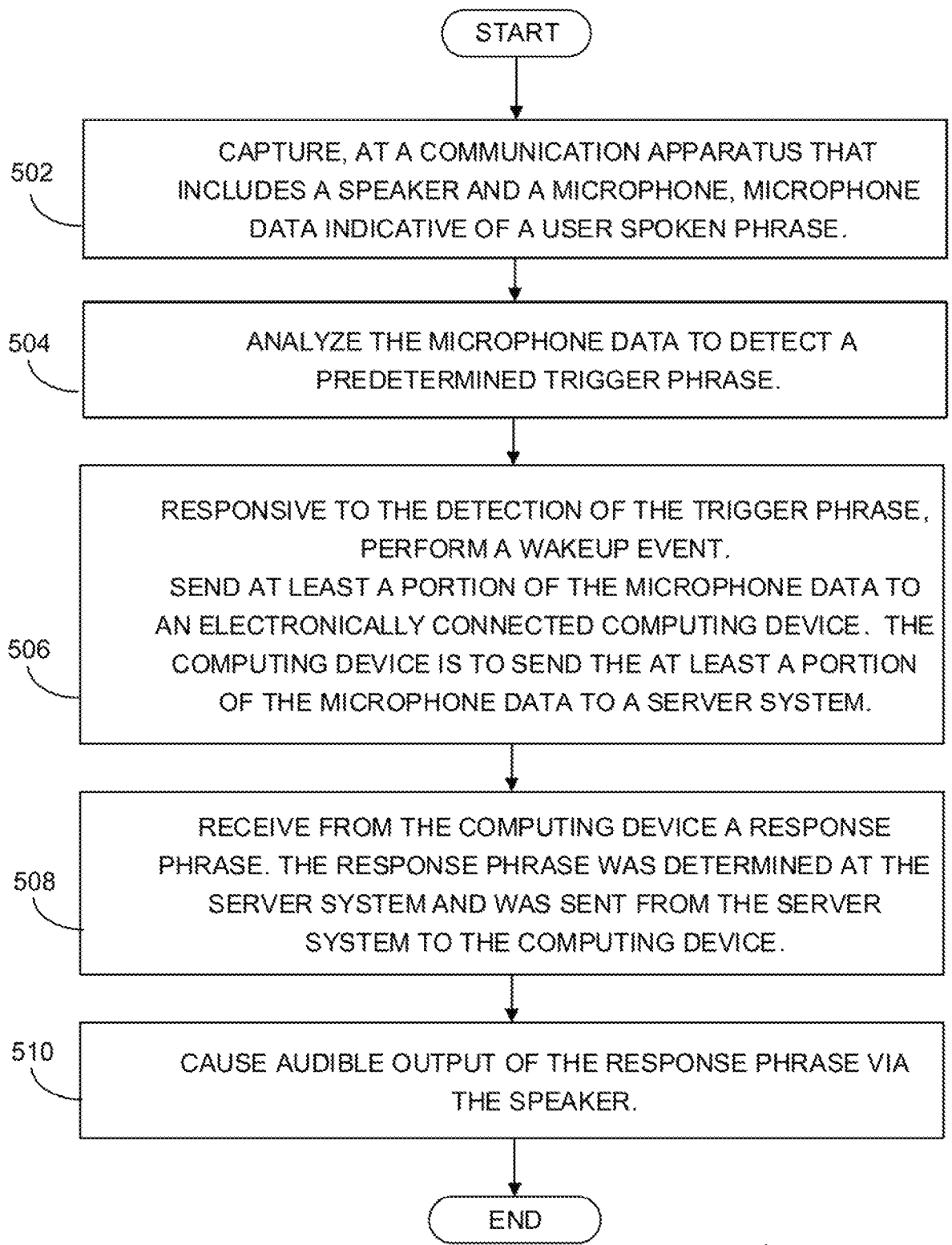
FIG. 5 is a flow diagram depicting implementation of an example of a communication method utilizing trigger phrases, the method including receiving a determined response phrase and causing an audible output of the response phrase.

FIG. 5 is a flow diagram of implementation of a communication method, the method including receiving a determined response phrase and causing an audible output of the response phrase. In discussing FIG. 5, reference may be made to the components depicted in FIGS. 1 and 2. Such reference is made to provide contextual examples and not to limit the manner in which the method depicted by FIG. 5 may be implemented. Microphone data indicative of a user spoken phrase is captured at a communication apparatus that includes a speaker and a microphone (block 502). Referring back to FIGS. 1 and 2, capture engine 102 (FIG. 1) or capture module 202 (FIG. 2), when executed by processing resource 240, may be responsible for implementing block 502.

The microphone data is analyzed to detect a predetermined trigger phrase (block 504). Referring back to FIGS. 1 and 2, trigger phrase engine 104 (FIG. 1) or trigger phrase module 204 (FIG. 2), when executed by processing resource 240, may be responsible for implementing block 504.

Responsive to the detection of the trigger phrase, a wakeup event is performed. At least a portion of the microphone data is sent to an electronically connected computing device. The computing device is to send the at least a portion of the microphone data to a server system (block 506). Referring back to FIGS. 1 and 2, engagement engine 106 (FIG. 1) or engagement module 206 (FIG. 2), when executed by processing resource 240, may be responsible for implementing block 506.

A response phrase is received from the computing device. The response phrase was determined at the server system and was sent from the server system to the computing device (block 508). Referring back to FIGS. 1 and 2, response receipt engine 108 (FIG. 1) or response receipt module 208 (FIG. 2), when executed by processing resource 240, may be responsible for implementing block 508.

The response phrase is caused to be audibly output via the speaker (block 510). Referring back to FIGS. 1 and 2, response output engine 110 (FIG. 1) or response output module 210 (FIG. 2), when executed by processing resource 240, may be responsible for implementing block 510.

Figure 6:
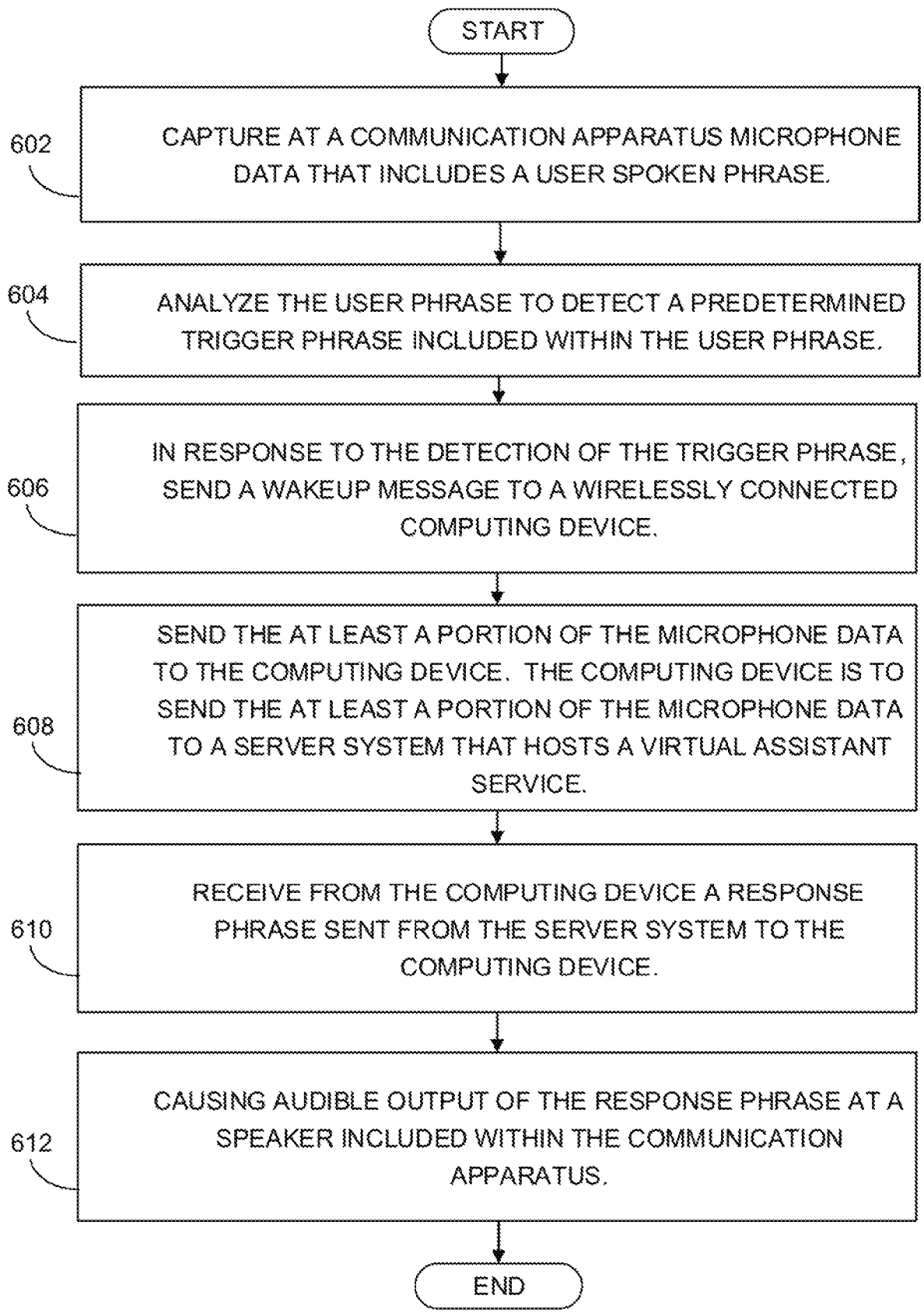
FIG. 6 is a flow diagram depicting implementation of an example of a communication method, the method including analyzing a user spoken phrase to detect a predetermined trigger phrase and sending a wakeup message to a wirelessly connected computing device in response to detection of the trigger phrase.

FIG. 6 is a flow diagram of implementation of a communication method, the method including analyzing a user spoken phrase to detect a predetermined trigger phrase and sending a wakeup message to a wirelessly connected computing device in response to detection of the trigger phrase. In discussing FIG. 6, reference may be made to the components depicted in FIGS. 1 and 2. Such reference is made to provide contextual examples and not to limit the manner in which the method depicted by FIG. 6 may be implemented. Microphone data that includes a user spoken phrase is captured at a communication apparatus (block 602). Referring back to FIGS. 1 and 2, capture engine 102 (FIG. 1) or capture module 202 (FIG. 2), when executed by processing resource 240, may be responsible for implementing block 602.

The user phrase is analyzed to detect a predetermined trigger phrase included within the user phrase (block 604). Referring back to FIGS. 1 and 2, trigger phrase engine 104 (FIG. 1) or trigger phrase module 204 (FIG. 2), when executed by processing resource 240, may be responsible for implementing block 604.

A wakeup message is sent to a wirelessly connected computing device responsive to the detection of the trigger phrase (block 606). Referring back to FIGS. 1 and 2, engagement engine 106 (FIG. 1) or engagement module 206 (FIG. 2), when executed by processing resource 240, may be responsible for implementing block 606.

The at least a portion of the microphone data is sent to the computing device. The computing device is to send the at least a portion of the microphone data to a server system that hosts a virtual assistant service (block 608). Referring back to FIGS. 1 and 2, engagement engine 106 (FIG. 1) or engagement module 206 (FIG. 2), when executed by processing resource 240, may be responsible for implementing block 608.

A response phrase is received from the computing device. The response phrase was sent from the server system to the computing device (block 610). Referring back to FIGS. 1 and 2, response receipt engine 108 (FIG. 1) or response receipt module 208 (FIG. 2), when executed by processing resource 240, may be responsible for implementing block 610.

An audible output of the response phrase is caused at a speaker included within the communication apparatus (block 612). Referring back to FIGS. 1 and 2, response output engine 110 (FIG. 1) or response output module 210 (FIG. 2), when executed by processing resource 240, may be responsible for implementing block 612.

FIGS. 1-6 aid in depicting the architecture, functionality, and operation of various examples. In particular. FIGS. 1 and 2 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is anon-transitory storage media that can contain, store, or maintain programs and, data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 4-6 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. What is claimed is:

What is claimed is:

1. A communication apparatus comprising:
   a microphone;
   a speaker;
   an interface to electronically connect with a computing device;
   a capture engine to capture, utilizing the microphone, microphone data indicative of a user spoken phrase;
   a trigger phrase engine to detect a first trigger phrase based on analysis of the microphone data, the first trigger phrase to wake the communication apparatus from a low power mode, and
   an engagement engine to:
      reformat the first trigger phrase to a second trigger phrase to wake a virtual assistant service hosted by a server system,
      perform a wakeup event responsive to the detection of the first trigger phrase, and
      send at least a portion of the microphone data to the computing device, wherein:
         the computing device is to send the at least a portion of the microphone data to the server system, and
         the second trigger phrase is included in the at least a portion of the microphone data sent to the computing device.

2. The communication apparatus of claim 1, wherein the wakeup event is to reestablish a wireless connection with the computing device.

3. The communication apparatus of claim 1, wherein the wakeup event is to send a wakeup message to the computing device.

4. The communication apparatus of claim 1, further comprising:
   a response receipt engine to receive, from the computing device, a response phrase sent from the server system to the computing device; and
   a response output engine to cause output, via the speaker, of the response phrase.

5. The communication apparatus of claim 1, wherein the trigger phrase is a phrase unique to the communication apparatus and is to wake the communication apparatus from a low power mode.

6. The communication apparatus of claim 1, wherein the trigger phrase engine is to analyze the microphone data to detect the trigger phrase, and is not to otherwise analyze the microphone data.

7. The communication apparatus of claim 1, wherein the communication apparatus is powered by a battery and is electronically connected to the computing device via a wireless network connection.

8. The communication apparatus of claim 3, wherein the sending of a wakeup message to the computing device is to wake the computing device from a power-saving state, and includes one of from the set of a mimicking of typing or touching at a keypad, keyboard, or touchscreen included within or connected to the computing device, a mimicking of a movement or click or a pointing device included within or connected to the computing device, and a sending of a magic packet.

9. The communication apparatus of claim 1, wherein the communication apparatus is a first communication apparatus among a plurality of communication apparatuses connected to the computing device via a private network, and wherein the wakeup event is to send a message to the computing device to establish the first communication apparatus as a default communication apparatus for the computing device to receive microphone data from.

10. A non-transitory, computer-readable medium storing instructions that when executed cause a processing resource to effect communication between a communication apparatus and a computing device, the instructions comprising:
   a capture module that when executed causes the processing resource to capture, at the communication apparatus, microphone data indicative of a user spoken phrase;
   a trigger phrase module that when executed causes the processing resource to analyze the microphone data to detect a predetermined trigger phrase;
   an engagement module that when executed causes the processing resource to, perform a wakeup event responsive to the detection of the trigger phrase, and to send at least a portion of the microphone data to the computing device;
   a response receipt module that when executed causes the processing resource to receive from the computing device a response phrase determined at a server system and sent from the server system to the computing device; and a response output module that when executed causes the processing resource to cause audible output, via the speaker, of the response phrase, wherein:

the trigger phrase is a first trigger phrase to wake the communication apparatus from a low power mode, the server system hosts a virtual assistant service, the engagement module when executed causes the processing resource to add a second trigger phrase that is different from the first trigger phrase to the at least a portion of the microphone data sent to the computing device, and the second trigger phrase to wake a virtual assistant service hosted by the server system.

11. The non-transitory, computer-readable medium of claim 10, wherein the wakeup event is one from the set of reestablishing a wireless connection with the computing device, and sending a wakeup message to the computing device.

12. The non-transitory, computer-readable medium of claim 11, wherein the sending of a wakeup message to the computing device is to wake the computing device from a power-saving state, and includes:

a mimicking of typing or touching at a keypad, keyboard, or touchscreen included within or connected to the computing device, a mimicking of a movement or press of a pointing device included within or connected to the computing device, and a sending of a magic packet.

13. The non-transitory, computer-readable medium of claim 10, wherein the trigger phrase module when executed causes the processing resource to apply voice recognition analysis to the microphone data to detect the trigger phrase, and the communication apparatus is not to otherwise apply voice recognition analysis to the microphone data.

14. A communication method, comprising:

capturing at a communication apparatus microphone data, the microphone data including a user spoken phrase;

analyzing the user spoken phrase to detect a predetermined trigger phrase included within the user phrase;

responsive to the detection of the trigger phrase, sending a wakeup message to a wirelessly connected computing device, the sending of the wakeup message to:

mimic typing or touching at a keypad, keyboard, or touchscreen included within or connected to the computing device, mimic movement or click of a pointing device included within or connected to the computing device, or send a magic packet;

sending the at least a portion of the microphone data to the computing device, wherein the computing device is to send the at least a portion of the microphone data to a server system that hosts a virtual assistant service;

receiving from the computing device a response phrase sent from the server system to the computing device; and causing audible output of the response phrase at a speaker included within the communication apparatus.

15. The communication method of claim 14, further comprising:

reformatting the trigger phrase to wake the virtual assistant, wherein:

the reformatted trigger phrase is included in the at least a portion of the microphone data sent to the computing device.

16. The communication method of claim 14, wherein:

the communication apparatus or the computing device includes programming to cause a wireless connection to be dropped during a predetermined period of inactivity, and the wakeup message causes the wireless connection to reestablish.

* * * * *